March 21, 1944.  C. F. BERRY  2,344,847
ENGINE VALVE MECHANISM
Filed Oct. 28, 1942  5 Sheets-Sheet 1

INVENTOR.
Clyde F. Berry
BY
William Pelzer
ATTORNEY

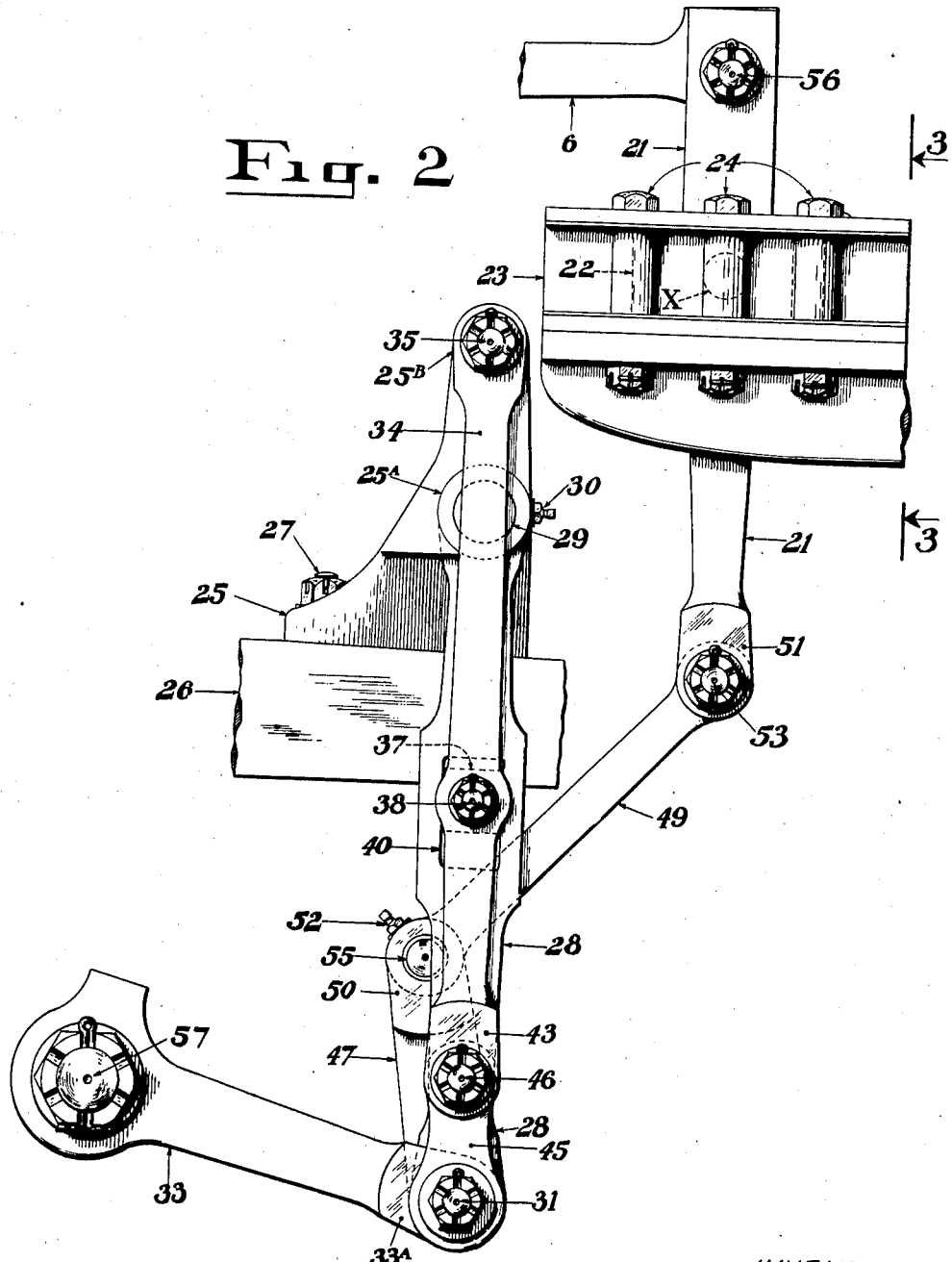

March 21, 1944.  C. F. BERRY  2,344,847
ENGINE VALVE MECHANISM
Filed Oct. 28, 1942  5 Sheets-Sheet 3
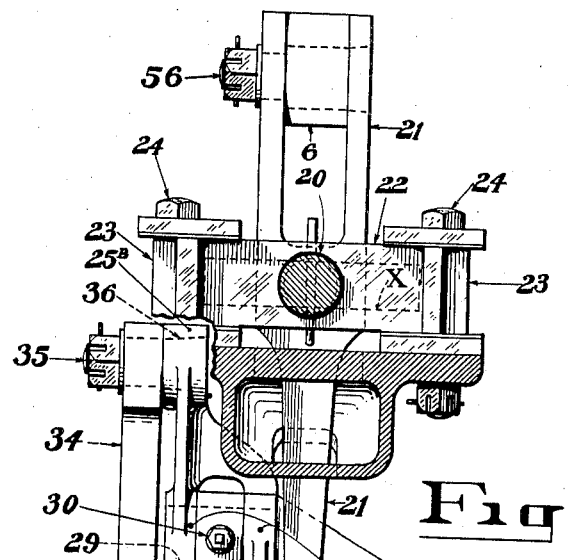
Fig. 4
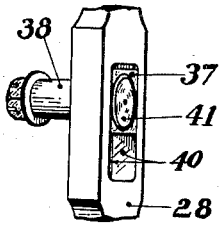
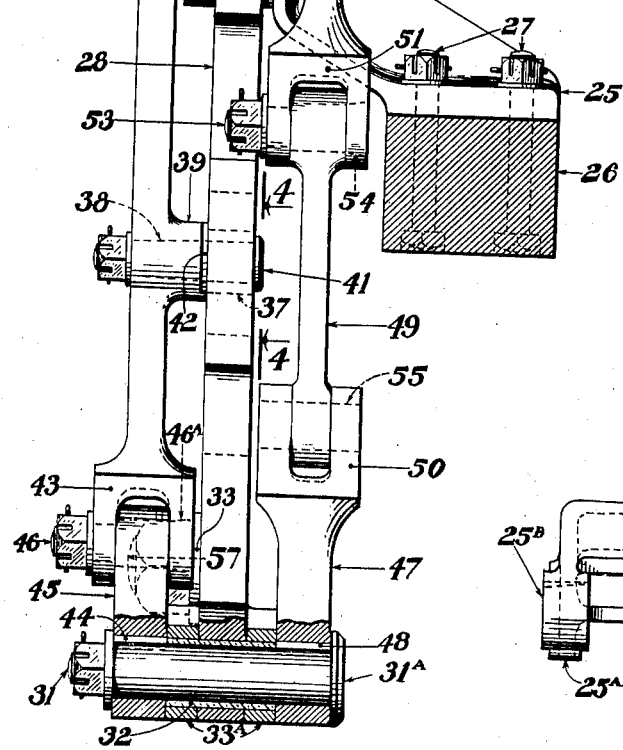
Fig. 3
Fig. 5
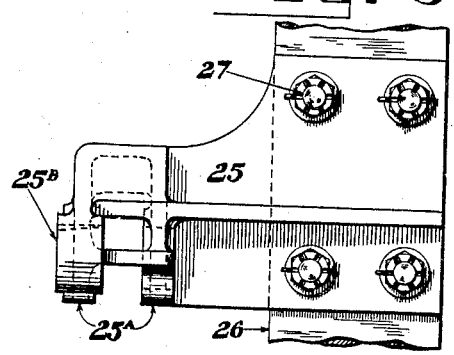
INVENTOR.
Clyde F. Berry
BY
William Pelzer
ATTORNEY March 21, 1944.  C. F. BERRY  2,344,847
ENGINE VALVE MECHANISM
Filed Oct. 28, 1942   5 Sheets-Sheet 4

INVENTOR.
Clyde F. Berry
BY
William Pelzer
ATTORNEY

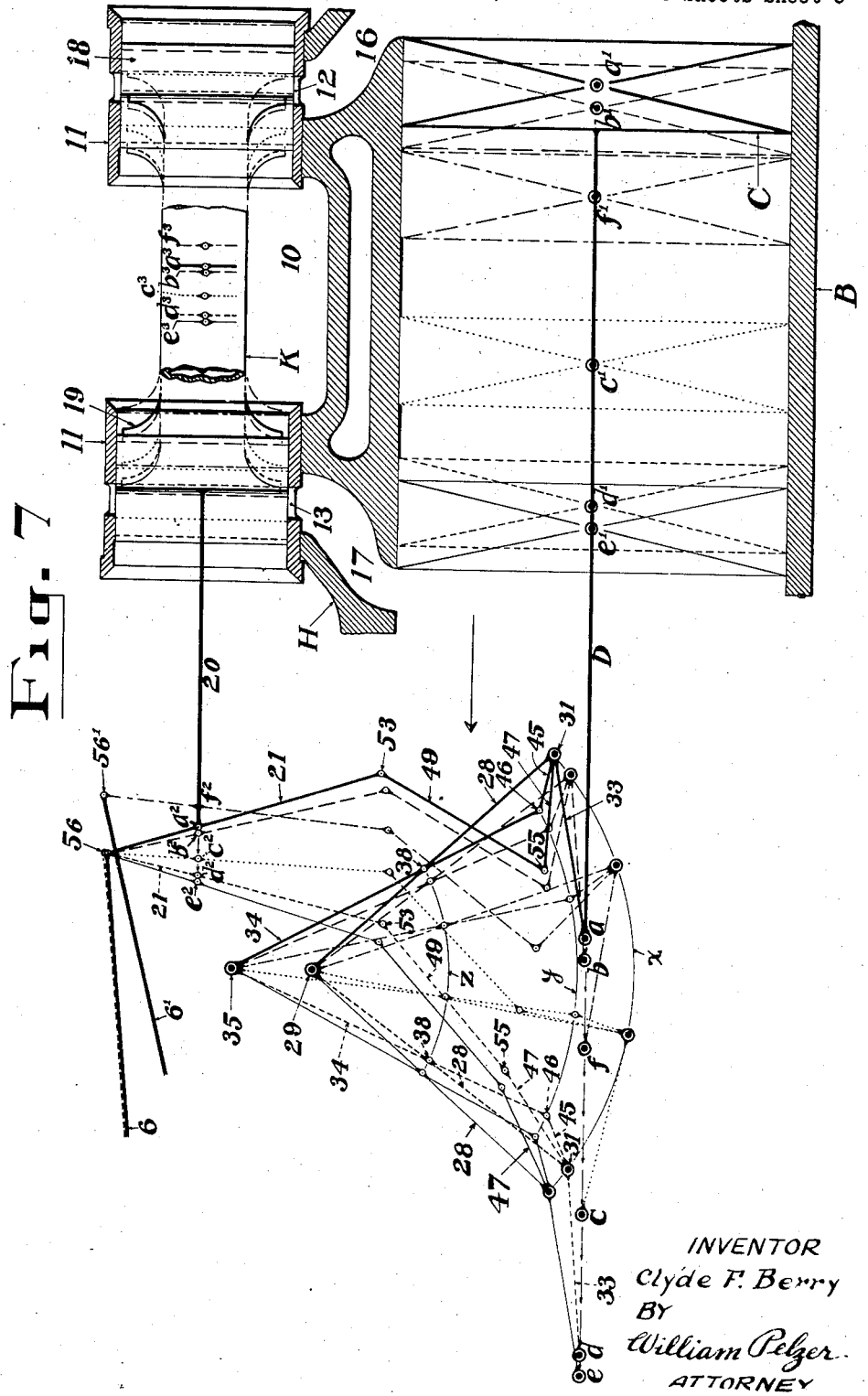

Patented Mar. 21, 1944

2,344,847

UNITED STATES PATENT OFFICE 2,344,847

ENGINE VALVE MECHANISM

Clyde F. Berry, Manchester, N. H.

Application October 28, 1942, Serial No. 463,719

15 Claims. (Cl. 121—163)

This invention relates to mechanism for actuating and controlling the movement and timing of slide valves of any type, for controlling the admission, expansion, compression and exhaust periods of the expansible actuating fluid or vapor at the piston cylinder of engines, particularly steam engines, and more particularly locomotive engines and especially engines whose valve motions are derived both from the main cross-head and main driving pin through the usual link mechanism.

One object of the invention is to provide an auxiliary lever and link system for application to the conventional link mechanism for modifying the usual compensating movements imparted to the valve by the piston and radius rods whereby the valve will be caused to automatically, constantly and uniformly afford more initial and rapid steam port opening at the beginning of each engine piston stroke than is usually obtained and without materially altering the arrangement or functioning of the standard piston and radius rod connections.

Another object is to provide an auxiliary mechanism for this purpose without affecting the total duration of the valve periods relative to the piston strokes.

A further object is to provide a mechanism whereby a greater steam port opening may be obtained without reducing the effectiveness of other valve events of compression, expansion and exhaust opening and duration.

A further object is to provide for this purpose a simple lever and link system adapted for connection between the usual piston cross-head, and the valve rod cross-head, and more specifically between the usual piston cross-head arm and the usual combining lever without change in construction and adjustments of the usual link motion.

A further object is to provide a mechanism in which the timing or controlling elements are entirely external to the valve chamber, whereby slide valves of standard types may be employed having no separate or auxiliary moving elements within the valve chamber, and whereby the functioning of the valve may at all times be adjusted and observed from without the valve chamber.

In carrying the invention into effect I provide instead of the usual direct pivotal connection between the piston cross-head arm and the combining lever a combination of levers and links pivotally connected between the cross-head arm and combining lever, whereby the movements of the cross-head arm are transmitted to the combining lever in a manner to automatically and directly vary the movement of the combining lever uniformly without lost motion to retard the speed of travel of the valve in its movements between ports and to accelerate the speed of travel beginning with the port opening through full opening and return for full closure at both ends of the valve stroke, thereby effecting rapid instantaneous steam admission and cut-off and relatively longer periods of expansion and exhaustion without varying the total duration of the periods of each cycle. By this means the standard spool type valve having the approved spacing and adjustment for lap and lead may be operated to provide high speed full opening and cut-off while maintaining a relatively longer exhaust port opening with maximum expansion period.

In the preferred form of the transmission device I employ a connection between the actuating arm on the piston rod cross-head and the combining lever pivoted on the valve stem cross-head consisting of two links and a pair of levers coupled together to constitute a crank, hereinafter designated as the guide and accelerator links and accelerator crank, respectively. The links are pendulously pivoted at different centers, preferably in the same vertical plane, and arranged to swing in unison due to a slide block and slot connection approximately at the mid-sections. The guide link terminates at its lower end in a collar which serves as a floating bearing for the accelerator crank, one arm of the crank being pivotally connected to the accelerator link, the other arm being pivotally coupled to the combining lever by a union link, and the accelerator crank shaft is pivotally coupled to the piston cross-head arm. Thus the guide link, accelerator link and accelerator crank constitute the auxiliary lever and link system connected between the piston cross-head and valve stem cross-head, or more specifically between the piston cross-head arm and the valve actuating combining lever. As the piston cross-head reciprocates back and forth with the piston travel the cross-head arm swings the guide and accelerator links back and forth, the guide link swinging in an arc of approximately sixty-five degrees, and the accelerator link swinging in an arc of approximately eighty-five degrees. This motion of the links due to the difference in length and suspension from different centers causes the accelerator crank to rotate on the cross-head arm in a clockwise direction at varying speed through an arc of approximately one hundred and fifty degrees while the cross-head moves backward its full stroke, and through a like arc at a like varying speed in the counter clockwise direction as the cross-head moves forward its full stroke, and this rotary movement of the accelerator crank through the union link connection draws the combining lever backward and forward with varying speed due to the relative movements of the guide and accelerator links.

The invention is illustrated in the accompanying drawings as applied to a locomotive engine, and in which, Figure 1 is a schematic view of a locomotive valve gear of the Walschaerts centrally pivoted link type with the auxiliary lever and link system of the present invention applied thereto, and showing the driving piston at approximately one-quarter of its backward stroke.

Figure 2 is an elevation on an enlarged scale of the preferred form of the auxiliary lever and link system as it would appear with the driving piston at approximately half stroke.

Figure 3 is an elevation and partial vertical section looking in the direction of the arrows 3—3 in Figure 2.

Figure 4 is a perspective view of the slide block connection between the guide and accelerator links looking in the direction of the arrows 4—4 in Figure 3.

Figure 5 is a top plan view of the suspension bracket for the guide and accelerator links.

Figure 6:
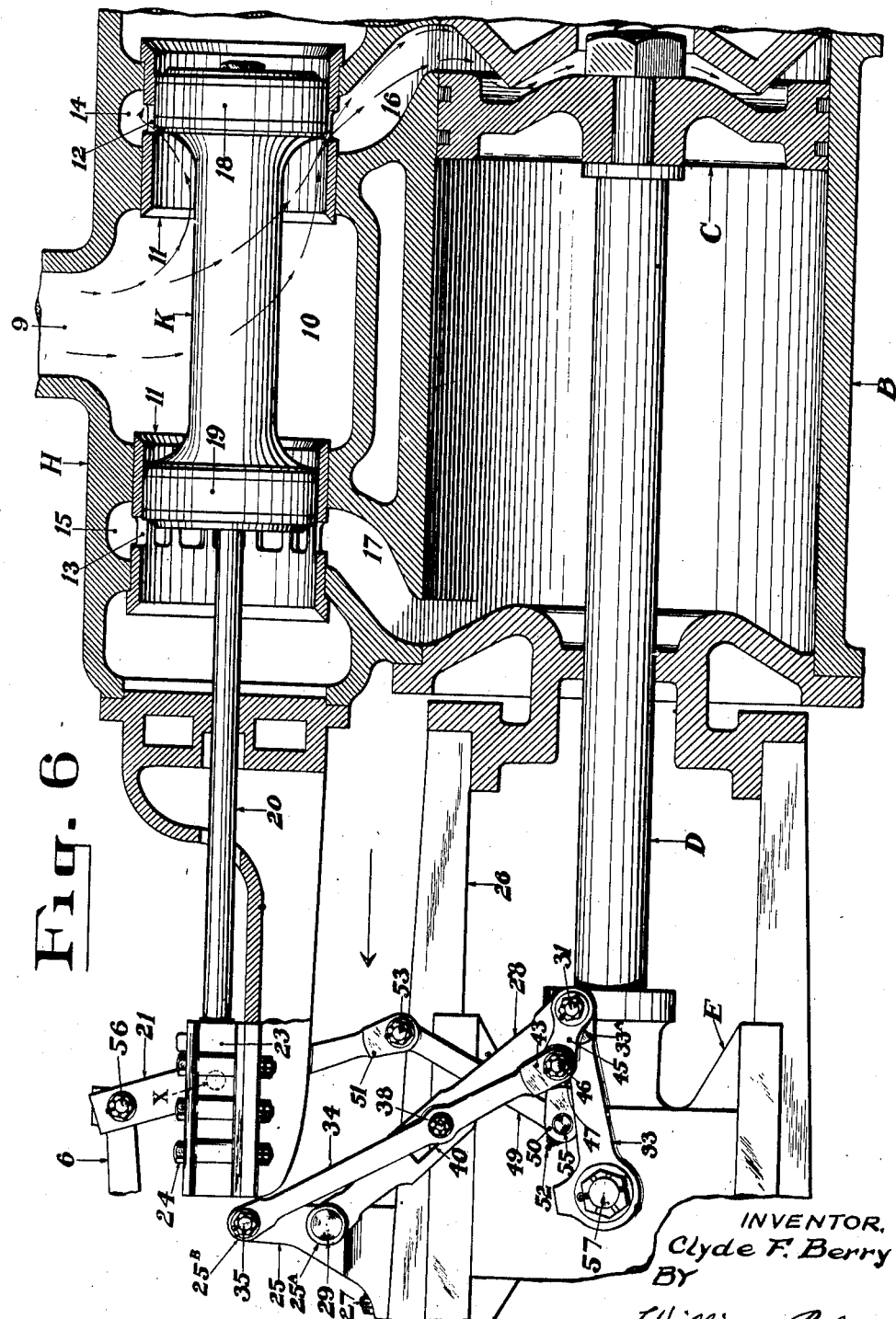

Figure 6 is a longitudinal elevation and partial vertical section through the piston cylinder, steam chest and valve chamber showing the position of the piston at full forward travel and the relative positions of the valve and transmission parts as the piston is about to start on its return stroke in the direction indicated by the arrow, and Figure 7 is a schematic view illustrating the movements of the piston, lever and link system and valve during the movement of the driving piston from the forward position of Figure 6 to the opposite or rearward position.

Figure 1:
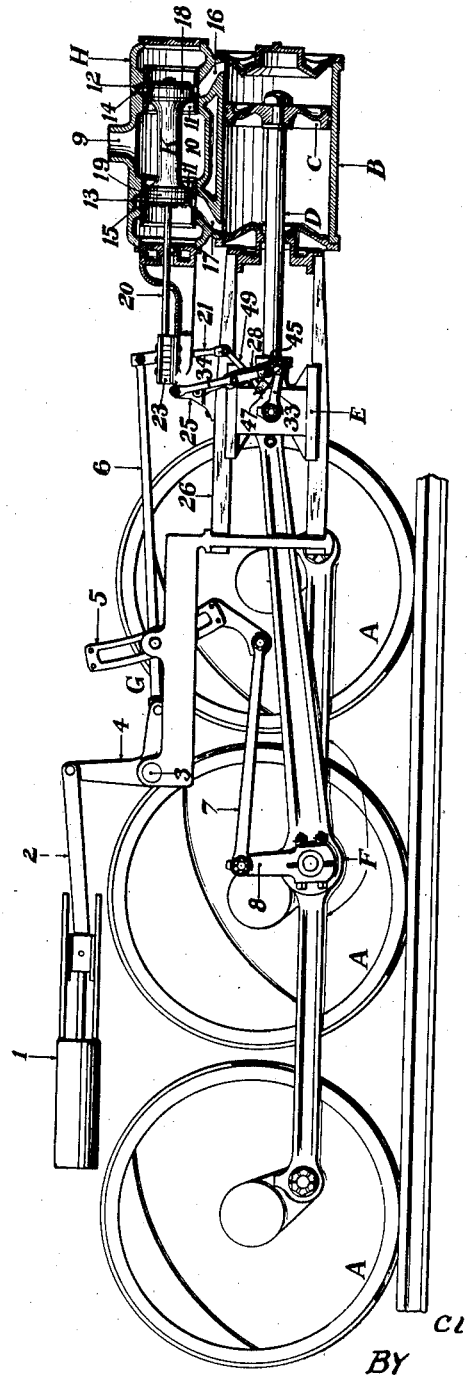

Referring to the drawings, and more particularly to Figure 1, A indicates the driving wheels of a locomotive, B the driving cylinder, C the driving piston, D the piston rod coupled to the piston cross-head E, which in turn is connected to the driving wheels through driving rods F. The valve gear is indicated generally by the letter G, and comprises power reverse cylinder 1, reach rod 2, reverse shaft 3, lifting lever 4, slotted and centrally pivoted reverse link 5, radius rod 6, eccentric rod 7 and eccentric crank 8. The usual steam chest is indicated at H provided with central steam admission port 9, chamber 10, cylindrical valve sleeves 11 having circumferential ports 12 and 13 opening into circumferential chambers 14 and 15, respectively, and which chambers are connected by ports 16 and 17, respectively, to the fore and aft ends of the driving cylinder B. The exhaust chambers at the ends of steam chest H will have the usual exhaust outlets which to avoid confusion are omitted. The piston valve K is the usual cylindrical piston of the spool type having heads 18 and 19 and valve stem 20. The shank of the spool K affords ample clearance for the entrance of steam into chamber 10 and curves outward at both ends to the edge of the valve heads to present uniform pressure surfaces on the inner sides of the valve heads so that the steam pressure in chamber 10 will have a balancing effect on the spool. The valve heads in practice will be provided with the usual spring packaging rings but otherwise will have no separate moving parts for the valve timing.

Referring now more particularly to Figures 2 to 5, which illustrate the auxiliary lever and link system on an enlarged scale, 21 indicates the usual combining lever of the conventional link valve gear; 22 the valve stem cross-head; 23 the cross-head slide and 24 the bolts for securing the slide-box parts together and to the supporting bracket. The auxiliary lever and link system is suspended from a bracket 25 mounted on a frame member 26 and secured thereto by bolts 27. Bracket 25 curves upward as seen in Figure 2, and at its mid-section has a bifurcated bearing 25$^a$ between which guide link 28 is pivoted, and extending upward from the bearing in an arm terminating in a bearing 25$^b$ on which is pivoted the accelerator link 34. Guide link 28 is pivoted on bearings 25$^a$ by pin 29 to which the lever is secured by set screw and lock nut 30. Accelerator link 34 is pivoted on bearing 25$^b$ by bolt 35 having a taper seat 36 in the bearing. Links 28 and 34 are coupled together at approximately their mid-sections by slide block 37 journalled on pin 38 seated in the hub 39 of link 34. Slide block 37 reciprocates in slot 40 of link 28 and is held in position within the slot by head 41 on pin 38 and washer 42, and the pin is held fixed in hub 39 by its tapered shank and nut. The lower end of guide link 28 is bored to receive the pivot pin 31 and sleeve 32, Figure 3, on which sleeve the bifurcated end of cross-head arm 33 is journalled, and the lower end of guide link 28 is journalled on the sleeve between the bearings 33$^a$ of arm 33. Pin 31 projects beyond the sleeve 32 and bearings 33$^a$ and upon one end of this pin accelerator arm 45 is seated and keyed thereto by key 44, and at the other end of the pin rocker arm 47 is seated and keyed thereto by a key 48. Pin 31 has a flat head 31$^a$ at one end and the opposite end is screw-threaded to receive a washer and nut to hold the assembly together. Thus arm 45, pin 31, and arm 47 constitute a crank which is pivoted on the cross-head arm 33. Arm 45 of the crank is pivotally coupled between the bifurcated end 43 of accelerator link 34 by a pin 46 having a tapered shank 46$^a$. Arm 47 has a bifurcater end 50 bored to receive pivot pin 55 upon which union link 49 is secured by set screw and lock nut 52. The lower end of the combining lever 21 is bifurcated as shown at 51 and bored to receive pivot pin 53 having a tapered end 54 and on which pin the upper end of union link 49 is hinged. Thus the auxiliary lever and link system comprising the guide link 28, accelerator link 34, accelerator crank 45—31—47, and union link 49, are coupled between cross-head arm 33 and combining lever 21 to transmit the reciprocating movements of piston cross-head E to valve stem cross-head 22 with a reduced stroke and at varying speeds due to the accelerating and decelerating effect of the crank 45—31—47 and links 28 and 34.

It will be understood that while the auxiliary lever and link system is shown in front of the driving piston cross-head, it may, according to the design of the engine, be applied at the rear side of the cross-head by reversing the cross-head arm 33, that is pointing rearward instead of forward. In such case the suspension bracket 25 would be positioned at the rearward end of frame member 26 and union link 49 would be correspondingly longer to connect the accelerator crank with the combining lever, and since union link 49 is merely a connecting member and the other elements of the auxiliary lever and link system not being altered the operation and timing would not change in any respect.

Referring now to Figures 1, 6 and 7, it will be observed that the driving piston C in Figure 1 is at approximately one-quarter its rearward movement with the radius rod 6 at the neutral or central position on reversing link 5, and that valve heads 18 and 19 are in the cut-off position at steam ports 12 and 13 so that admission to both passages 16 and 17 is cut off. To start the engine forward the link mechanism is actuated by operating the power shifter 1—2 to swing arm 4 of the shifter-lever forward and move the slide of radius rod 6 downward in link 5 thereby shifting the rod 6 forward. This movement actuates the combining lever 21 (which at that moment swings on pivot center 53, Figure 6, as its fulcrum) and shifts valve stem cross-head 22 forward and the pivot point 56, Figure 7, to position 56' which causes valve K to move forward to its extreme forward position for full opening of port 12 to admit the maximum steam pressure against the forward side of piston C to drive it rearward and rotate the drive wheels for the start of forward travel. The movement of the piston C rearward actuates the valve gear, and on reversal at the end of the rearward stroke, the valve gear drives the valve back toward the position of Figure 6. The functioning of the valve mechanism with the radius rod 6 in the neutral position of Figure 1, and starting with the driving piston C in the forward position shown in Figure 6, will now be described by reference to Figure 7 which illustrates successive stages of the piston, valve and valve gear.

In Figure 7 is shown schematically the position of the valve gear as seen in Figure 6, $a$ indicating the position of cross-head pin 57, $a'$ the center of piston C at the limit of its forward stroke while the valve gear is operating with the radius rod 6 in the neutral position, $a^2$ the pivot point X of the combining lever 21 on valve stem cross-head 22, and $a^3$ the center of the valve spool K. The relative positions of piston C, rod D, heads 18 and 19 of valve K, valve stem 20, combining lever 21, cross-head arm 33, the auxiliary lever and link system 28, 34, 45, 47 and 49, and radius rod 6 corresponding to the positions of these parts in Figure 6 are indicated by the heavy solid lines. Assuming the radius rod 6 to be in the neutral position on link 5 as shown in Figure 1, and the steam supply to chamber 10 open and port 12 partly open to admit steam through passage 16 to the front of piston C for forward drive, the flow will be as indicated by the arrows in Figure 6, and the movement of the piston and valve will be in the direction indicated by the arrows in Figures 6 and 7. It will be observed that the arm 33 of cross-head E is in a nearly horizontal position and as the cross-head moves backward, that is, to the left as viewed in Figures 6 and 7, the arm 33 imparts a direct pull on the accelerator crank. At this moment the crank and arm 33 are held against upward swing by the guide link 28, and the crank arms 45—47 are held momentarily against rotation by the accelerator link 34, with the result that the accelerator crank arms 45—47 are pulled in the direction of the arrow with a very slight clockwise rotation of the crank thereby imparting through union link 49 a quick pull to combining lever 21 and effecting a rapid cut-off at port 12—16 by valve-head 18. This movement is indicated in the diagram, Figure 7, by the broken lines and the movement of centers $a$, $a'$, $a^2$ and $a^3$ to the positions $b$, $b'$, $b^2$ and $b^3$, respectively, which illustrates the short quick movement imparted to the valve mechanism and valve during the movement of cross-head center 57 from position $a$ to position $b$ which is the cut-off position. The movement of the auxiliary lever and link system started by this movement of the piston cross-head causes link 28 and 34 to swing in the same direction on their fixed centers 29 and 35, as indicated by the successive broken and dotted line positions, and the pivot centers 31, 46 and 38 to travel in the arcs $x$, $y$ and $z$. Owing to the difference in length of links 28 and 34 and the difference in the pivotal points 29 and 35 the slide block 37 will slide upward on link 28 as the links approach a parallel relation, and the differential in the arcs $x$—$y$ in which pivot points 31 and 46 travel causes clockwise rotation of the accelerator crank. The driving piston C travels at approximately uniform speed, but during the movement of the cross-head center from $b$ to $c$ and the piston center from $b'$ to $c'$, the pivot point X of the combining lever 21 moves to $c^2$ and the valve center moves to $c^3$ at a gradually decelerating speed, the cross-head arm 33 and the lever and link system shown in small dotted lines. This decelerating movement of the valve gear is caused by the action of the guide and accelerating links on the accelerator crank arms to effect a clockwise rotation of the crank, and consequently a gradual slowing down of the pull of union link 49 on the combining lever as indicated by the relative positions shown by the solid line, long dash, and dotted line positions $a$, $b$ and $c$, respectively. From the central position of the combining lever pivot point $c^2$ the movement of the lever and link system due to the movement of cross-head center point $c$ to point $d$ causes the movement of the valve center from point $c^3$ to point $d^3$, the valve traveling now at a slowly accelerating speed due to the gradually increasing straight line pull of the cross-head arm 33 and the gradually decreasing clockwise rotation of the accelerator crank. The position of the lever and link system at this point is indicated by the short dash lines and it will be observed that at this point the crank arm 47 and union link 49 are practically in a straight line to begin a more direct straight line pull on the combining lever 21. At this time the driving piston center has moved to point $d'$ near the end of the rearward stroke and now as the cross-head center moves from point $d$ to point $e$ and the driving piston center moves to point $e'$ the cross-head arm 33 completes the rearward stroke of the valve, the pivot point of the combining lever 21 moving to point $e^2$ and the valve center to $e^3$. This position of the valve and the lever and link system is indicated by the thin solid line position of the parts. Thus the movement from $d$ to $e$ is a short rapid movement for effecting the opening of the valve port 13 to passage 17 for admission of steam to the rear of the driving piston the instant it arrives at the end of its rearward stroke and the full opening of the passage 16 to port 12 for the exhaust from the front of the piston which begins when the valve-stem pivot center is at $c^2$ and the valve center at $c^3$. The driving piston now starts its return or forward stroke and as the cross-head center moves from point $e$ to point $d$ the cross-head arm 33 pushes the accelerator crank forward producing a very slight counter clockwise movement of the crank and an almost straight line push by crank arm 47 to union link 49, and consequently a quick push to the combining lever 21 moving the pivot point $e^2$ to $d^2$ and the valve center from $e^3$ to $d^3$, thereby effecting a rapid cut-off at port 13 as the piston center reaches the point $d'$. The expansion and exhaust period now proceeds as before while the accelerator crank is caused to rotate in the counter-clockwise direction at a faster rate to effect the gradually decelerating forward movement of the valve until its center reaches the point $c^3$, whereupon the accelerator crank continues to rotate in the counter-clockwise direction but at a gradually decreasing rate and causing a slowly accelerated speed of movement of the valve until the combining lever pivot point reaches the point $b^2$ and the cross-head center arrives at $b$. The lever and link system and the cross-head arm 33 will now be in position to impart the direct push to the accelerator crank and a quick push to the combining lever for the rapid opening of port 12 as the driving piston center arrives at the point $a'$ the end of the forward stroke as indicated by the heavy solid lines in Figure 7.

During the reciprocation of the cross-head center between the points $a$ and $e$ the accelerator crank rotates in the clockwise and counter-clockwise direction as above stated through an arc of approximately one hundred and fifty degrees, and it will be readily seen from the several solid and broken line positions of the lever and link system that the relative movements of the guide and accelerator links 28 and 24 cause the gradually varying speed of rotation of the accelerator crank to vary the speed of oscillation of the combining lever and the speed of reciprocation of the valve and a direct short rapid push and pull at each end of the valve stroke.

When the radius rod 6 is shifted on link 5 away from the neutral position, the radius rod pivot point 56 will shift to the right or left through the oscillation of link 5. Thus if the radius rod is shifted downward to the extreme on link 5, the action of the eccentric rod 7 and eccentric crank 8 on radius rod 6 will cause the combining lever to swing to the point 56', Figure 7, on the forward stroke of rod 7 and to a like degree in the opposite direction on the rearward stroke. This shift of the combining lever pivot point 56 to either extreme occurs when the driving piston is approximately at the mid-part of its stroke due to the angle at which the drive crank and eccentric crank are set, and therefore does not alter the functioning of the auxiliary lever and link system to produce the rapid opening and closing at the ports, and the corresponding accelerating and decelerating movements of the valve between port openings and closings. The position of the driving piston center $f'$ in Figure 7 corresponds to the position of the piston in Figure 1 at which time the cross-head center would be at $f$, and upon shifting the radius rod on link 5 to its extreme downward limit for starting forward, the pivot center 56 as above stated would shift to 56' and the valve would be moved forward to the limit to provide full opening of port 12. In this position the combining lever and the auxiliary lever and link system is indicated by the dot and dash lines and the corresponding centers are indicated at $f^2$ and $f^3$. After the initial stroke the positions of the auxiliary levers and links at the extremes of each stroke of the driving piston C will be as indicated by the light and heavy solid lines. This is due to the relative pivotal centers 29—35 and 31—46 of links 28 and 34 and the position of pivot center 57 of the cross-head arm 33; and since eccentric 8 is fixed on the drive pin to provide a predetermined angular movement of link 5 and reciprocation of radius rod 6 relative to the reciprocation of the driving piston, the pivot center 56 of rod 6 and combining lever 21 will always be at its mid-position relative to the swing of the combining lever when the driving piston is at either end of its stroke, and therefore the relative positions of the auxiliary levers and links at the extreme positions will be as shown in Figure 7.

It will be understood that various changes may be made in the specific arrangement and functioning of the auxiliary lever and link system without departing from the spirit of my invention, the main object being to accomplish a more rapid and greater opening to both the admission and exhaust ports without altering the duration of the complete cycle of valve periods, or sacrificing any essential functioning of the valve. It will be observed as above stated that the location of the auxiliary lever and link system may be ahead of or behind the driving piston cross-head without affecting the operation or timing of the valve periods, and that the specific arrangement and connections of the levers and links may be readily modified so long as the auxiliary lever and link system is connected between the piston cross-head arm and the valve stem cross-head lever, thereby permitting the employment of simple levers and links and the usual simple valve stem cross-head and obtaining direct reciprocation of the valve stem cross-head by the combining lever without lost motion, and without the use of cams, eccentrics, gears, or other rotary devices for transforming motion, and thus avoiding the use of expensive machined parts involving accurate centering and alignment and additional bearings subject to wear and requiring frequent replacement or readjustment to secure and maintain the highly essential accurate and uniformly constant timing of the valve periods.

What I claim is:

1. In an engine valve mechanism, the combination of a valve operating lever actuated from a driving piston cross-head, an arm pivoted on said cross-head, a crank pivotally coupled to said cross-head arm, an operative connection between said crank and said valve operating lever, and a link pivotally suspended from a fixed center relative to said cross-head and operatively connected to said crank for modifying the movements transmitted from the cross-head through said crank to the valve operating lever at each end of the valve stroke.

2. In an engine valve mechanism, the combination of a valve operating lever actuated by a combined movement derived from a driving piston cross-head and a drive shaft eccentric, an arm pivoted on said cross-head, a crank pivotally coupled to said cross-head arm, an operative connection between said crank and said valve operating lever, and a link pivotally suspended from a fixed center relative to said cross-head and operatively connected to said crank for modifying the movements imparted to the valve operating lever from the cross-head and drive shaft eccentric at each end of the valve stroke.

3. In an engine valve mechanism, the combination of a valve operating lever actuated by a combined movement derived from a driving piston cross-head and a drive shaft eccentric, an arm pivoted on said cross-head, a crank pivotally coupled to said cross-head arm, an operative connection between said crank and said valve operating lever, and a link pivotally suspended from a fixed center relative to said cross-head and operatively connected to said crank for causing the valve operating lever to actuate the valve at accelerated speed at each end of the stroke for admission and cut-off, at a gradually decelerating speed during the expansion period, and at a gradually accelerating speed during the exhaust period.

4. In an engine valve mechanism, the combination of a valve operating lever actuated by a combined movement derived from a driving piston cross-head and a drive shaft eccentric, an arm pivoted on said cross-head, a crank pivotally coupled to said cross-head arm, an operative connection between said crank and said valve operating lever, and a link pivotally suspended from a fixed center relative to said cross-head and operatively connected to said crank for gradually accelerating the valve movement derived from the cross-head in both directions from the central position of the valve between port openings and closings, and for imparting rapid strokes to the valve in opening and closing the ports to effect high speed admission and cut-off at both ends of the valve stroke.

5. In an engine valve mechanism, the combination of a valve operating lever actuated by a combined movement derived from a driving piston cross-head and a drive shaft eccentric, an arm pivoted on said cross-head, a crank pivotally coupled to said cross-head arm, an operative connection between said crank and said valve operating lever, and a link pivotally suspended from a fixed center relative to said cross-head and operatively connected to said crank for varying the speed of valve travel uniformly in both directions from the central position of the valve, whereby for a predetermined length of travel the speed and length of port opening, the speed of cut-off, and the relative exhaust and expansion periods are increased.

6. In an engine valve mechanism, the combination with a reciprocating valve and a valve operating lever actuated through an arm on the driving piston cross-head, of a lever and link system connected between said valve operating lever and actuating arm, comprising two pendulously pivoted links and a crank lever, the crank lever being pivotally supported by one of said links and rotatably coupled to said cross-head arm, one arm of said crank being pivotally coupled to the other link, and the other arm of said crank being pivotally coupled to said valve operating lever.

7. In an engine valve mechanism as specified in claim 6, the two pendulously pivoted links being separately pivoted at centers in vertical alignment and pivotally coupled together for relative longitudinal movement in unison.

8. In an engine valve mechanism, the combination with a reciprocating valve and a valve operating lever actuated through an arm on the driving piston cross-head, of a lever and link system connected between said valve operating lever and actuating arm, comprising a guide link, an accelerator link and an accelerator crank, the crank being pivotally supported by the guide link and rotatably coupled to said cross-head arm, one arm of said crank being pivotally coupled to the accelerator link, and the other arm of said crank being pivotally coupled to said valve operating lever.

9. In an engine valve mechanism as specified in claim 8, the guide and accelerator links being separately pivoted at centers in vertical alignment and pivotally coupled together for relative longitudinal movement in unison.

10. In a valve mechanism for locomotive engines, the combination with a link valve gear having a combining lever coupled to the valve stem and actuated by a driving cross-head arm and a drive wheel eccentric, of a lever and link system connected between said cross-head arm and combining lever, comprising two pendulously pivoted links and a crank lever, the crank lever being pivotally supported by one of said links and rotatably coupled to said cross-head arm, one arm of said crank being pivotally coupled to the other link, and the other arm of said crank being pivotally coupled to said combining lever.

11. In a valve mechanism for locomotive engines as specified in claim 10, the two pendulously pivoted links being separately pivoted at centers in vertical alignment and pivotally coupled together for relative longitudinal movement in unison.

12. In a valve mechanism for locomotive engines, the combination with a link valve gear having a combining lever coupled to the valve stem and actuated by a driving cross-head arm and a drive wheel eccentric, of a lever and link system connected between said cross-head arm and combining lever, comprising a guide link, an accelerator link and an accelerator crank, the crank being pivotally supported by the guide link and rotatably coupled to said cross-head arm, one arm of said crank being pivotally coupled to the accelerator link, and the other arm of said crank being pivotally coupled to said valve combining lever.

13. In a valve mechanism for locomotive engines as specified in claim 12, the guide and accelerator links being separately pivoted at centers in vertical alignment and pivotally coupled together for relative longitudinal movement in unison.

14. In a valve mechanism for locomotive engines, the combination with a link valve gear having a combining lever coupled to the valve stem and actuated by a driving cross-head arm and a drive wheel eccentric, of a lever and link system connected between said cross-head arm and combining lever, comprising a guide link, an accelerator link, an accelerator crank, and a union link, said guide and accelerator links being separately pivoted at centers in vertical alignment and pivotally coupled together for relative longitudinal movement in unison, the accelerator crank being pivotally supported by the guide link and rotatably coupled to said cross-head arm, one arm of said crank being pivotally coupled to the accelerator link, and the other arm of said crank being pivotally coupled to the combining lever through the union link.

15. In a valve mechanism for locomotive engines as specified in claim 14, the accelerator crank having a short arm pivotally coupled to the accelerator link and a long arm pivotally coupled to the combining lever through the union link.

CLYDE F. BERRY.